United States Patent
Israelsen

(10) Patent No.: US 10,132,669 B2
(45) Date of Patent: Nov. 20, 2018

(54) METHODS AND SYSTEMS FOR TANK LEVEL MONITORING AND ALERTING

(71) Applicant: Quantum IR Technologies, LLC, Saint George, UT (US)

(72) Inventor: Mark C. Israelsen, Draper, UT (US)

(73) Assignee: Quantum IR Technologies, LLC, Saint George, UT (US)

( * ) Notice: Subject to any disclaimer, the term of this patent is extended or adjusted under 35 U.S.C. 154(b) by 18 days.

(21) Appl. No.: 15/197,574

(22) Filed: Jun. 29, 2016

(65) Prior Publication Data

US 2017/0091585 A1  Mar. 30, 2017

Related U.S. Application Data

(60) Provisional application No. 62/186,226, filed on Jun. 29, 2015.

(51) Int. Cl.
| | |
|---|---|
| G06K 9/00 | (2006.01) |
| G01F 23/00 | (2006.01) |
| G06K 9/46 | (2006.01) |
| G06T 7/11 | (2017.01) |
| G06K 9/38 | (2006.01) |
| G06T 7/136 | (2017.01) |

(52) U.S. Cl.
CPC ..... *G01F 23/0061* (2013.01); *G06K 9/00771* (2013.01); *G06K 9/38* (2013.01); *G06K 9/4647* (2013.01); *G06T 7/11* (2017.01); *G06T 7/136* (2017.01); *G06T 2207/10048* (2013.01)

(58) Field of Classification Search
None
See application file for complete search history.

(56) References Cited

U.S. PATENT DOCUMENTS

| | | | | |
|---|---|---|---|---|
| 2011/0174706 | A1* | 7/2011 | Russell | A01G 25/00 210/170.01 |
| 2016/0343124 | A1* | 11/2016 | Sundheimer | G06Q 40/04 |

OTHER PUBLICATIONS

Yan et al., Edge Detection of Tank Level IR Imaging Based on the Auto-adaptive Double-threshold Canny Operator, 2008 IEEE computer Society, 366-370.*
Li et al. Auto-adaptive Edge Detection of Tank Level IR Imaging Using Double-threshold Canny Operator, 2010 IEEE, 246-248.*

* cited by examiner

*Primary Examiner* — Randolph I Chu
(74) *Attorney, Agent, or Firm* — Knobbe, Martens, Olson & Bear, LLP

(57) ABSTRACT

Methods and systems for tank level management are disclosed. In some aspects, one or more regions of interest are defined within an image acquired from an imaging sensor. Histograms of pixel values within each region of interest are generated, and thresholds delineating two groups of similar pixel values within each region of interest are determined. In some aspects, the tank level within each region of interest is based on the corresponding threshold. In some aspects, rows of pixel values within each region of interest are thresholded. The thresholded rows may be used to determine the tank level within the region. Some aspects determine whether the pixel values are bimodal based on the generated histogram. Unimodal pixel values may represent either an empty or full tank. A similarity to preconfigured values associated with full or empty tank conditions may facilitate identification of whether the tank is full or empty.

18 Claims, 6 Drawing Sheets

METHODS AND SYSTEMS FOR TANK LEVEL MONITORING AND ALERTING

CROSS REFERENCE TO RELATED APPLICATIONS

This application claims priority to U.S. Provisional Application No. 62/186,226, filed Jun. 29, 2015, and entitled "INFRARED IMAGING SYSTEMS AND METHODS FOR TANK LEVEL MANAGEMENT." The disclosure of this prior application is considered part of this application, and is hereby incorporated by reference in its entirety.

FIELD OF THE INVENTION

The present application relates generally to computer analysis of thermal images. In particular, disclosed are methods and systems for managing levels of holding tanks within a region of interest of an image captured by an imaging sensor.

BACKGROUND

Current methods of monitoring levels in holding tanks are generally directed to mechanical systems, for example, systems that include a float or a sight-glass to determine a tank level. Some other systems include one or more radar based gauges, for example using frequency modulated continuous waves to measure a level of substance in a tank. In some implementations, a frequency sweeping microwave signal is generated by such a system, and a wave is propagated directed down (e.g., vertically) into the tank being measured. Energy reflected by a top surface of a substance in the tank is collected by an antenna. Electronics derive a distance from the gauge to the surface based on a time delay of the reflected signal.

While radar-based systems are accurate, their reliability does not always meet requirements of petroleum refinery operators. In some cases, tank overfills have occurred due to these failures. Therefore, improved methods and systems for tank level management are needed.

SUMMARY OF THE INVENTION

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide tank level management within regions of interest in an image captured by an imaging sensor.

DETAILED DESCRIPTION

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different applications and system configurations, some of which are illustrated by way of example in the figures and in the following description of the preferred aspects. The detailed description and drawings are merely illustrative of the disclosure rather than limiting, the scope of the disclosure being defined by the appended claims and equivalents thereof.

Figure 1:
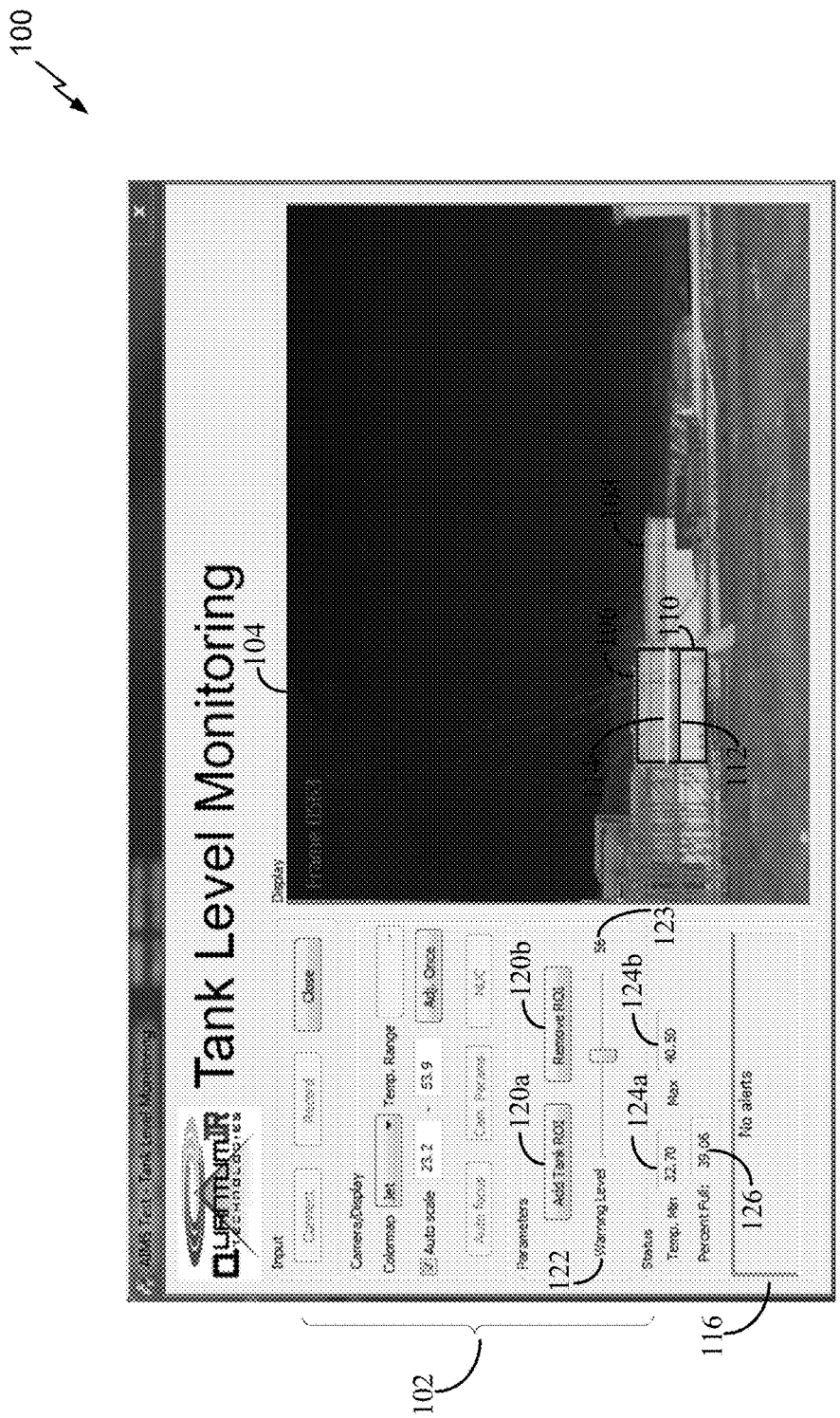
FIG. 1 is a screen shot of a user interface for tank level monitoring.

FIG. 1 is a screen shot of a user interface for tank level monitoring. User interface 100 includes a controls portion 102 and an image portion 104. In the illustrated example of FIG. 1, the image portion 104 shows a field of view including one or more oil tanks 106 and 108. In some embodiments, the image portion 104 may be configured to display multiple FOV's, for example, two or more FOV's, or 3, 4, 5, 6, 7, or 8, or more FOV's. Each FOV may represent image information captured by a different sensor. In some aspects, the image portion 104 may be generated by stitching together multiple field of views from multiple Two or more FOV's may be captured by the same sensor, which may be a camera, or different sensors. The sensor may a different viewpoint for the FOV due to, for example, the sensor being physically moved (e.g., rotated to a different viewing angle) or due to the FOV being captured at a different imaging characteristic (e.g., zoom level, brightness or other imaging parameter). In some embodiments, the different FOV's may include different objects or may be different views of the same object, taken by different sensors or with different imaging parameters. Image portion 104 also includes a region of interest (ROI) 110. The region of interest 110 may be analyzed by the methods and systems disclosed herein to determine a level of a substance within the tank 106. Note that in the illustrated embodiment of FIG. 1, there is no region of interest for tank 108. However, the disclosed methods and systems contemplate the existence of multiple regions of interest in some aspects that are analyzed in parallel or over a same period of time.

Also shown in the image portion 104 is a level indication 112. In some aspects, the level indication 112 may be displayed based on the results of block 540, discussed below with respect to FIG. 5. Also shown in image portion 104 is an alert level indicator 114. The alert level indicator 114 indicates a level of the tank 106 that will generate an alert. No alert condition is present, as shown in status window 116.

Within the controls portion 102 are region of interest controls 120a-b, a warning level control 122, temperature status indicators 122a-b, and a percent full indicator 124. The region of interest controls 120a-b may be used to create, destroy, or modify one or more regions of interest in the image portion 104, such as region of interest 110. The warning level control 122 may enable a user to set a warning level for a current region of interest selected in the image portion 104. The user interface 100 shows a current warning level 123 of the region of interest 110 set to a temperature of 56° C.

The controls portion 102 also shows a minimum temperature 124a displayed in the image portion 104, and a maximum temperature 124b displayed in the image portion 104. The controls portion 102 also includes a percent full indicator 126. The percent full indicator 126 indicates a percent of the region of interest 110 that is containing a substance.

Figure 2:
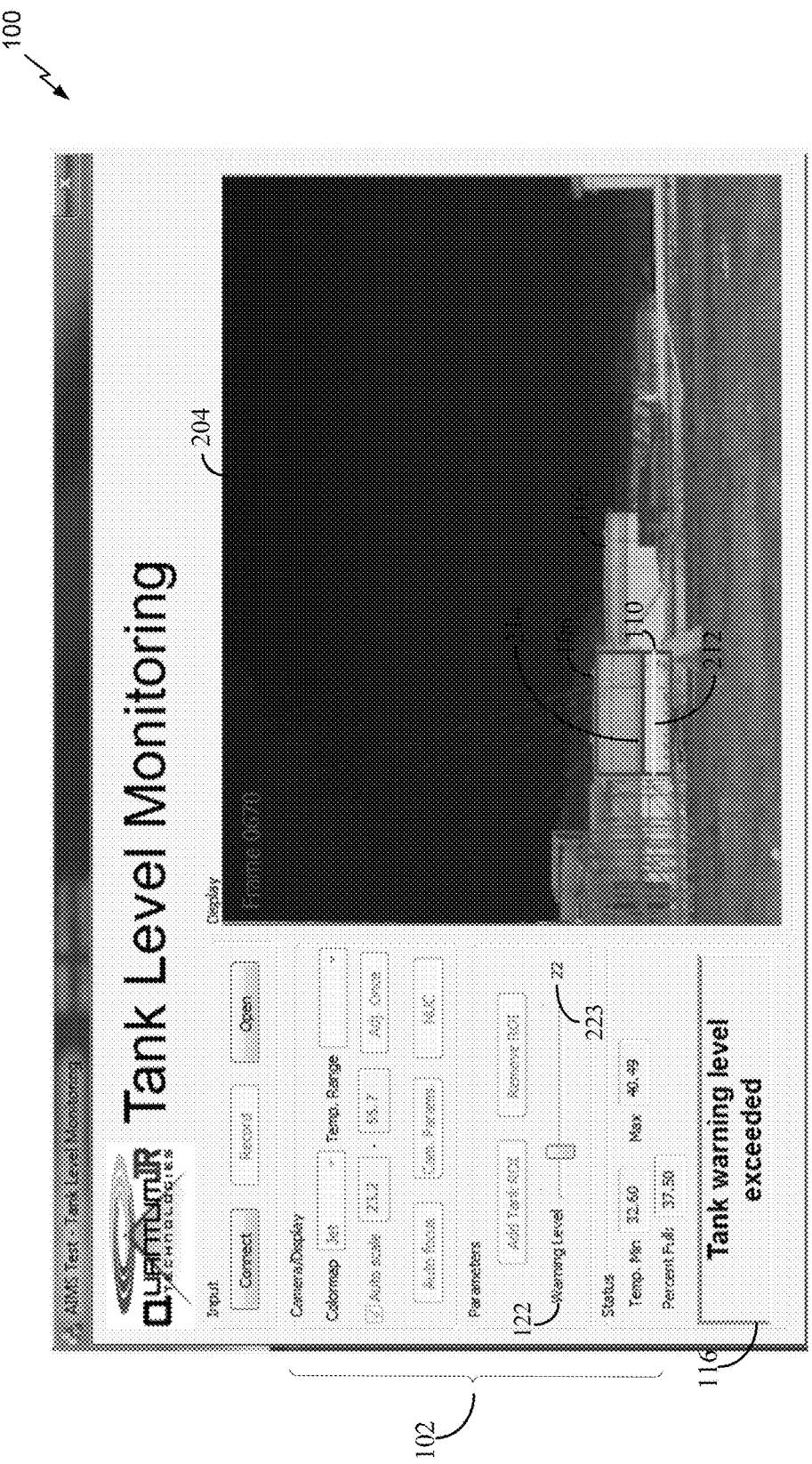
FIG. 2 is a screen shot of a second user interface for tank level monitoring.

FIG. 2 is a screen shot of a second user interface for tank level monitoring. In contrast to the user interface 100 shown with respect to FIG. 1, the user interface 100 shown in FIG. 2 shows a controls portion 102 and an image portion 204 that is identifying the region of interest 110 that has reached an alert-able condition. The alert-able condition is caused by a level of substance in the region of interest 110 (in this case, overlaying the tank 106) has exceeded an alert level. Other embodiments may include alert-able conditions that are present when a level of substance in a region of interest is below an alert level. The alert condition is shown in the status window 116. As shown in FIG. 1, the region of interest 110 is shown around the tank 106. An alert level indicator 212 is also shown, which is positioned lower in the tank than the alert indicator 114 of FIG. 1. This is the result of the warning level control 122 being set at 22° C. in FIG. 2 as compared to a value of 56° C. in FIG. 1.

In the illustrated aspect, a level of the tank is shown by level indication 214. In the illustrated embodiment, level indication 214 is higher in the tank than the alert level indicator 212. Thus, because the level of the tank indicated by 214 is above the alert level indicator 212 (corresponding to warning level 223 set by warning level control 122), an alert-able condition is present.

In some aspects, color may be used to distinguish between a region of interest with an alert-able condition and a region of interest that does not have an alert-able condition. For example, in some aspects, a region of interest with an alert-able condition present may be shown in red on the display, whereas a region of interest without such a condition may be shown in blue or white in some aspects.

Figure 3:
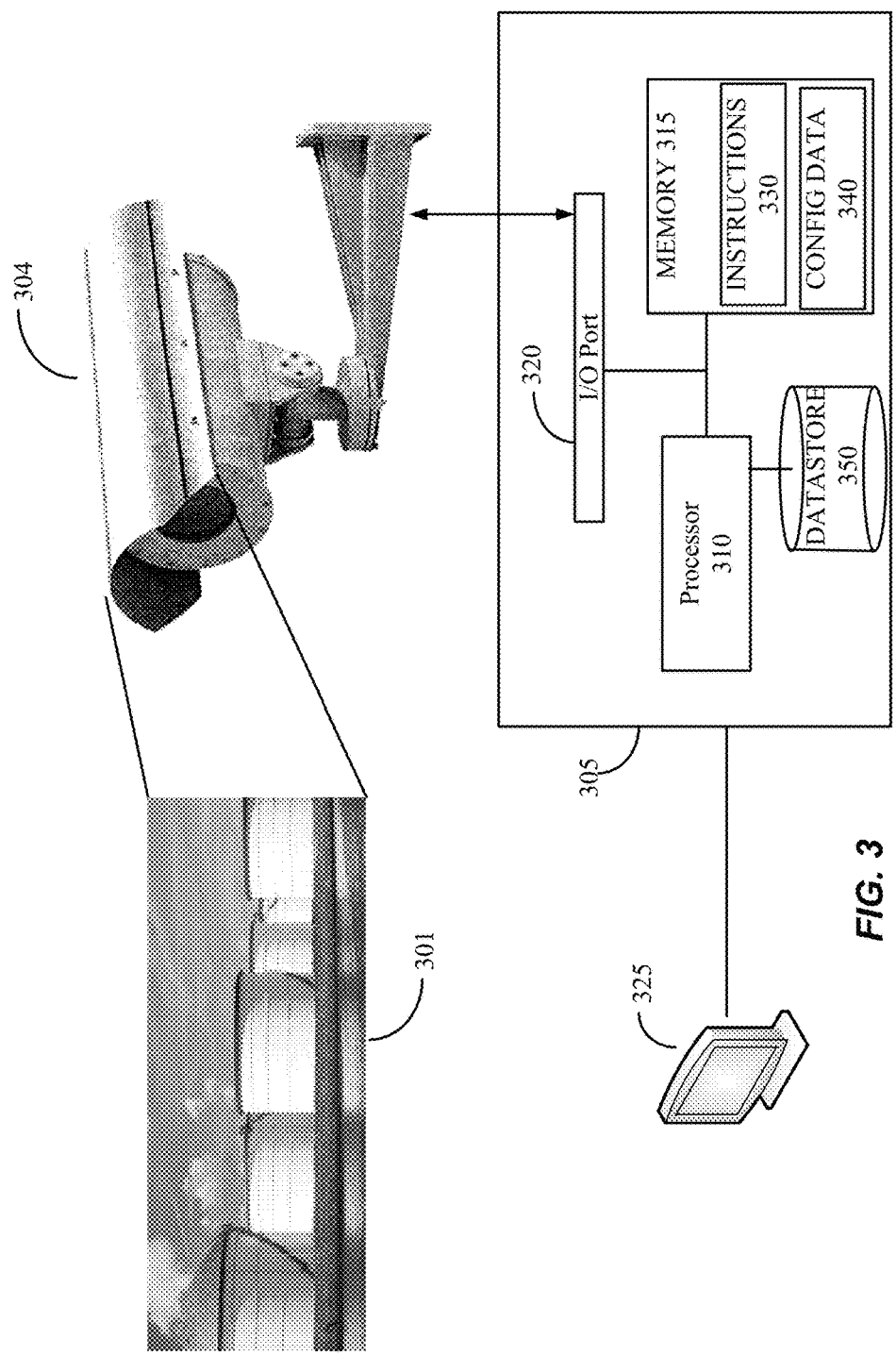
FIG. 3 is a block diagram showing one embodiment of the methods and systems disclosed.

FIG. 3 is a block diagram showing one embodiment of the methods and systems disclosed. FIG. 3 shows a scene 301 imaged by an imaging sensor 304. In some aspects, the imaging sensor may capture infrared wavelengths of light and convert the captured wavelengths into digital data.

An image analysis computer 305 includes an electronic hardware processor 310, electronic hardware memory 315, an I/O port 320, and a datastore 350. The image analysis computer 305 is operably connected to an electronic display 320. Via the I/O port 320, the processor 310 may communicate with the imaging sensor 304. For example, the processor 310 may be configured to transmit one or more configuration parameters to the imaging sensor 304, and command the imaging sensor to capture one or more images. The processor 310 may further be configured to receive digital images from the imaging sensor that represent the captured scene 301.

The memory 315 may store instructions 330 that configure the processor 310 to perform one or more of the functions disclosed herein. For example, the memory may store instructions 330 that configure the processor 310 to retrieve an image from the imaging sensor 304 and display the image on the electronic display 325. The memory may include further instructions 330 that configure the processor 310 to define one or more regions of interest in the image, and monitor temperatures present in the regions of interest through successive images captured from the imaging sensor 304. In some aspects, the memory 315 may include instructions 330 that configure the processor 310 to set warning and/or alert threshold values for temperatures within one or more regions of interest defined in the image of the scene 301, and generate warnings and/or alerts when those threshold values are exceeded. The memory may also store configuration data 340. The configuration data may include configuration data for the imaging sensor 304, and/or configuration data to support the user interface 100 shown with respect to FIG. 1A-B. For example, one or more of the parameters defining the number and positions of the regions of interest within the images 104 and 204 may be stored as configuration parameters 240.

The processor 310 may write and read data from the data store 350. For example, in some aspects, the processor 310 may write a series of tank level measurements to the data store 350, and then utilize the series of tank level measurements to determine a rate at which the tank is being filled or emptied.

Figure 4:
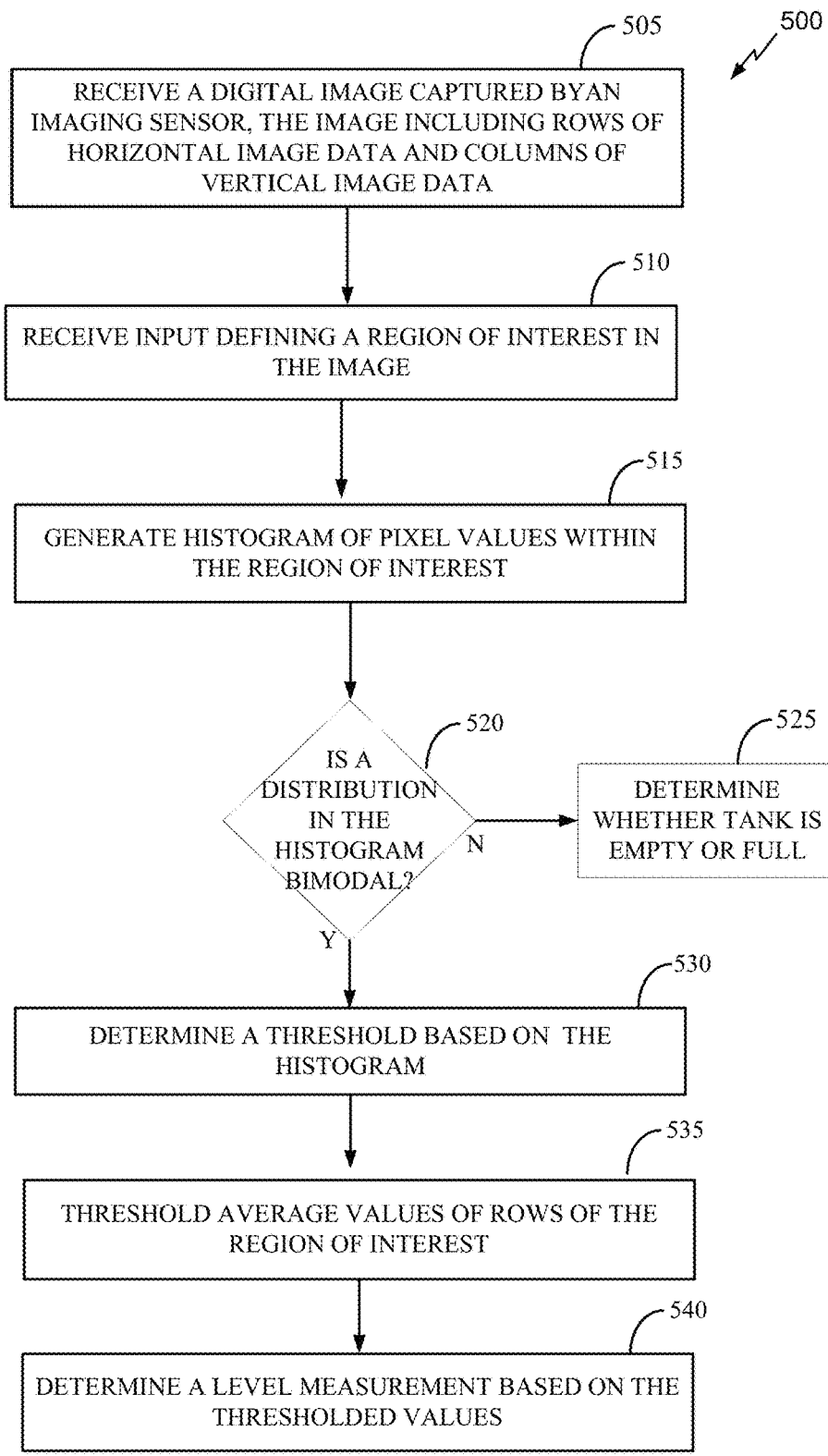
FIG. 4 is a flowchart of a process to determine a level of a substance holding tank.

FIG. 4 is a flowchart of a process to determine a level of a substance holding tank. In some aspects, the holding tank may contain a petroleum product. However, other types of holding tank and substances are contemplated. For example, the tank may contain grain, water, industrial or other chemicals, or any other substance. In some aspects, the tank may be transparent or semi-transparent to visible light. In some aspects, the tank may be opaque to visible light.

One or more of the functions discussed below with respect to process 500 may be performed by the processor 310, discussed above with respect to FIG. 3. For example, in some aspects, instructions 330 stored in the memory 315 may configure the processor 310 to perform one or more of the functions discussed below with respect to process 500.

In block 505, a digital image is received. The digital image is captured by an imaging sensor. In some aspects, the imaging sensor captures light wavelengths in a visible spectrum, for example, 390 to 700 nanometers (nm). In some other aspects, the imaging sensor captures light wavelengths in a different spectrum, such as an infrared spectrum (e.g. 700 nm to one (1) millimeter). The image includes rows that represent horizontal image data. Horizontal image data represents image or light or wavelength information that was acquired from a plane that is parallel to the horizon of the earth. The image also includes columns that represent vertical image data. The vertical image data represents image or light or wavelength information obtained from a plane that is perpendicular to the horizon of the earth. The distinction between horizontal and vertical data may be relevant in the disclosed methods and systems. For example, earth's gravity causes a substance within a holding tank to be distributed evenly across a horizontal plane, but not necessarily across a vertical plane. This uneven distribution of a substance across the vertical plane may be utilized to measure a level of a substance in the holding tank at least in some aspects.

In block 510, input is received defining a region of interest in the image. The input may be received, in some aspects, from a pointing device and/or keyboard of a user interface. For example, a user may select a region of interest in the digital image using a pointing device and/or keyboard. For example, the region of interest may correspond to region of interest 110, shown in FIGS. 1 and 2. In some aspects of block 510, the input may be received from a network. For example, the user interface may be physically attached to a client device that is in communication with the device performing process 500 via the network. After the user interface of the client device defines the region of interest, information defining the region of interest may be transmitted from the client device to the device performing process 500 in some aspects. A region of interest may define a subset of pixels within the image. In some aspects, the region of interest may encompass all pixels in the image. The region of interest defines boundaries (top, bottom, left, and right) that delineate pixels included in the region of interest from pixels not included in the region of interest.

In block 515, a histogram of pixel values within the region of interest is generated. The histogram is not based on any pixel values outside the region of interest. The histogram groups pixel values with similar values and performs a summation of pixels within each group. The groups may represent unique pixel values or may represent a range of pixel values. To generate a histogram, a histogram is not necessarily presented in graphical form. Histogramming can comprise simply associating each pixel value within the region of interest with a group of a plurality of groups, without necessarily displaying or rendering a graphical depiction of a "histogram" per se.

In block 520, process 500 determines whether a distribution of values in the histogram is bimodal. In some aspects, a bi-modality coefficient may be used to determine whether the distribution in the histogram is bimodal. For example, in some aspects, equation (1) may be used to determine whether the distribution contains two or more modes:

$$b = \frac{g^2 + 1}{k + \frac{3(n-1)^2}{(n-2)(n-3)}} \quad (1)$$

Where:
  n is the number of items in the sample (the number of pixel groups in the histogram in some aspects)
  g is the sample skewness of the sample
  k is the sample excess kurtosis of the sample.

The value of b for a uniform distribution is 5/9. Values greater than 5/9 may indicate a bimodal or multimodal distribution in some aspects. If the distribution is determined to be bimodal, process 500 moves to block 530, which determines a threshold based on the histogram.

If decision block 520 determines the histogram does not include a bimodal distribution, process 500 moves to block 525 which determines whether the tank is empty or full. To determine whether the tank is completely empty or completely full, process 500 may rely on input from a user, or from another process or sensor, or from information stored in a database. For example, in some aspects, input may be received associating a particular pixel value or values with a portion of a tank that is empty or a portion of a tank that has substance behind it. This input may be stored in first and/or second configuration data. In some embodiments, information from another tank level detection system (e.g., a mechanical system) is used as an input to determine whether the tank is empty or full. In another example, an input for the empty/full determination may be information about the current state of the tank, for example, if a lower portion of the tank is opened for maintenance or some other operational process.

In some aspects, an average or median value of pixel values in the digital image may be compared to the first configuration data. If the pixel values are within a second threshold value of the first configuration data, then process 500 may determine whether the tank is empty or full based on the similarity of the pixel values to the configuration values. For example, if the first configuration data indicates an empty tank condition, and the pixel values are within the second threshold distance from the first configuration data value, process 500 may determine the tank is completely empty. Alternatively, if the pixel values are further than the second threshold distance from the first configuration data value, process 500 may determine the tank is full. Alternatively, if a second configuration data value indicates an occupied or full tank condition, then if the pixel values are within the second threshold distance of the second configuration data value, process 500 may determine the tank is full. Alternatively, if the pixel values are greater than the second threshold distance from the second configuration data value, process 500 may determine the tank is empty.

In block 530, a threshold is determined based on the histogram. In some aspects, Otsu's method may be used to determine the threshold. Otsu's method may be typically used to convert greyscale images into binary images. In block 530, it may not necessarily be used to create a binary image per se, but Otsu's method of first determining a threshold may be used to determine the threshold of block 530. For example, in one aspect, Otsu's method identifies a threshold that minimizes intra-glass variance (the variance within a class or set of pixel values within the region of interest). In another aspect, Otsu's method may identify a threshold that maximizes an inter-class variance.

In block 535, median or average values of rows of the region of interest are thresholded. For example, if a median or average value of a particular row is above the threshold determined in block 530, a thresholded value for the row may be set to a first value, while if the median or average value of the particular row is below the threshold, the thresholded value for the row may be set to a second value. In some aspects, the first or second values for rows of the region of interest may be stored in a binary vector, with each cell in the vector representing a separate thresholded value of a particular row in the region of interest.

In block 540, a level measurement is determined based on the binary vector. In some aspects, the level measurement may determine a proportion of each binary value in the vector. This may be used as a level measurement. For example, if a percent of the binary vector set to a particular binary value is represented by v, the level measurement may be determined to be v %. Alternatively, in some aspects, the level measurement may be set to (1−v) % in some aspects.

Figure 5:
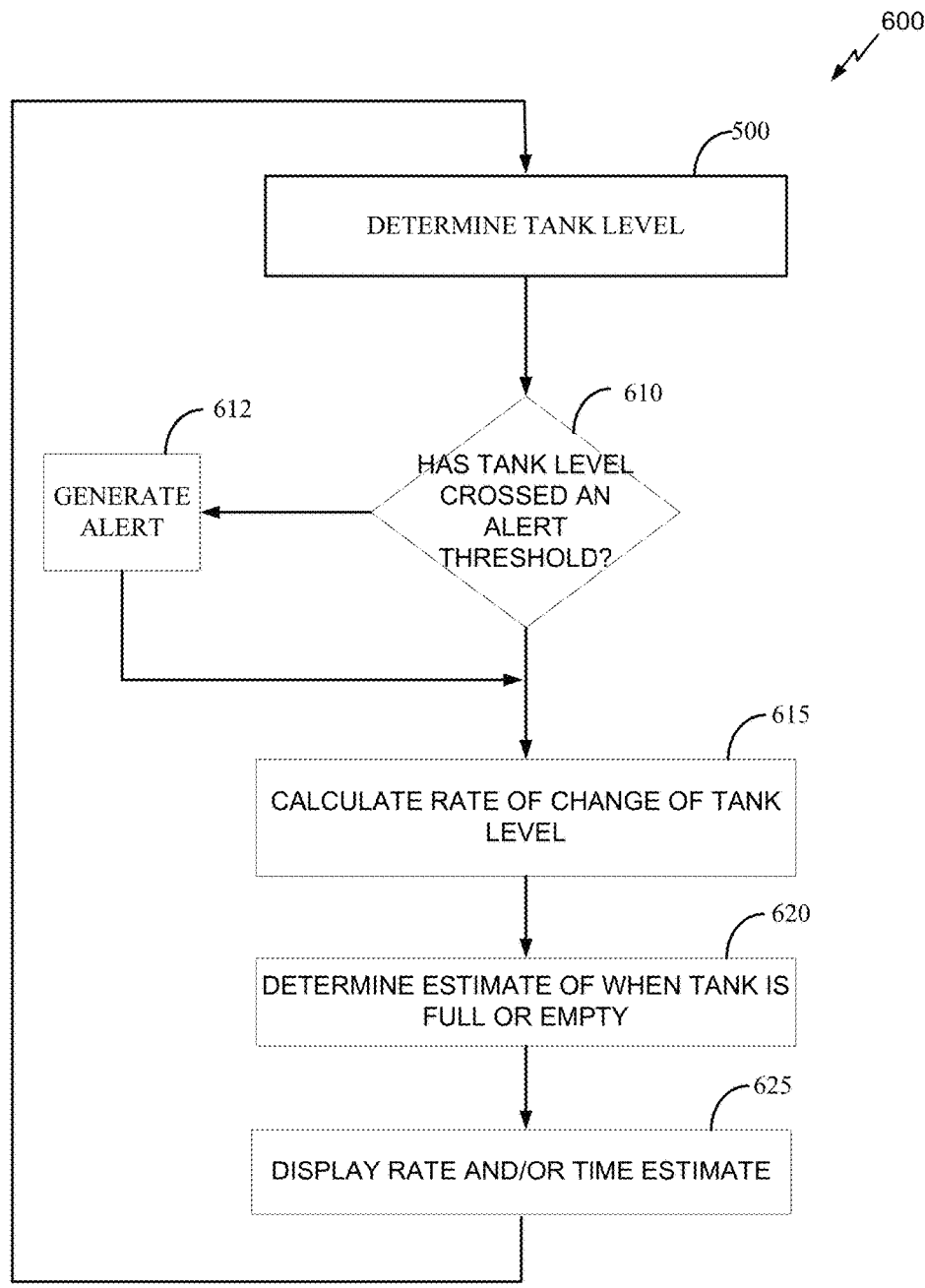
FIG. 5 is a flowchart of a method of managing a level of a tank based on tank level measurements provided by process 500, discussed above.

FIG. 5 is a flowchart of a method of managing a level of a tank based on tank level measurements provided by process 500, discussed above. One or more of the functions discussed below with respect to process 600 may be performed by the processor 310, discussed above with respect to FIG. 3. For example, in some aspects, instructions 330 stored in the memory 315 may configure the processor 310 to perform one or more of the functions discussed below with respect to process 500.

In block 500, process 500, discussed above with respect to FIG. 4, is performed. The result of process 500 is that a level of the tank is provided to process 600. Process 500 may include storing the determined tank level to a data store, such as data store 350. The stored tank level may be utilized to calculate a rate of change in the tank level and/or an estimate of when the tank may become full or empty, as described below with respect to block 615.

Decision block 610 determines whether the tank level determined in block 500 has crossed an alert threshold. Crossing an alert threshold may occur when a previous measurement of the tank level was below (or above) the alert threshold, and the level determined in block 500 returns a level that is above (or below, respectively) the alert threshold. An alert threshold may be defined by configuration data, which may have been set, in some aspects, via a user interface. For example, the alert threshold may be defined by warning level control 122 as shown in FIG. 1 and FIG. 2. If the tank level has crossed an alert threshold, process 600 moves to block 612, where an alert is generated. If the alert threshold has been crossed, process 600 moves to block 612, where an alert is generated. In some aspects, generating an alert may include displaying one or more indications on an electronic display. For example, as shown in FIG. 2, generating an alert may include displaying a message in the status window 116. In some aspects, generating an alert may include transmitting a network message indicating the alert condition to another device. For example, indicating the alert condition may include indicating the alert threshold and indicating the tank level that caused the alert to be generated in the network message.

In block 615, a rate of change of the tank level is determined. For example, in some aspects, process 600 may maintain a record of tank levels determined by process 500 over a period of time. For example, this record may be stored in the data store 350 discussed above with respect to FIG. 3. This record may be used to determine a rate at which the level of the tank is changing. In some aspects, the rate is a moving average rate. In these aspects, the moving average may represent a rate of tank level change over the past 1, 2, 3, 4, 5, 10, 20, 30, or 60 seconds. In some aspects, the moving average may represent a rate of change of the level of the tank over the past 1, 2, 3, 4, 5, 10, 15 or 30 minutes.

In block 620, an estimate of when the tank will reach a desired capacity is determined. In some aspects, block 620 may estimate when the tank will be full (with a positive rate of change determined in block 615) or empty (with a negative rate of change determined in block 615). Some aspects may enable a desired capacity to be set via a modified version of the user interface 100 shown in FIGS. 1-2. For example, in some aspects, the estimate is based on the tank level determined in block 500 and the rate determined in block 615. For example, if the rate of change of tank level is negative, in that the tank is being less occupied, block 620 may determine a time estimate when the tank will be empty. If the rate of change indicates the tank is becoming more occupied with time, block 620 may determine a time estimate when the tank will be full.

In block 625, the determined rates of block 615 and/or the determined estimate of when the tank is empty, full, or reaches a configured level is displayed. In some aspects, block 625 stores the estimated time and/or determined rate to a data store, such as data store 350 discussed above with respect to FIG. 3.

Figure 6:
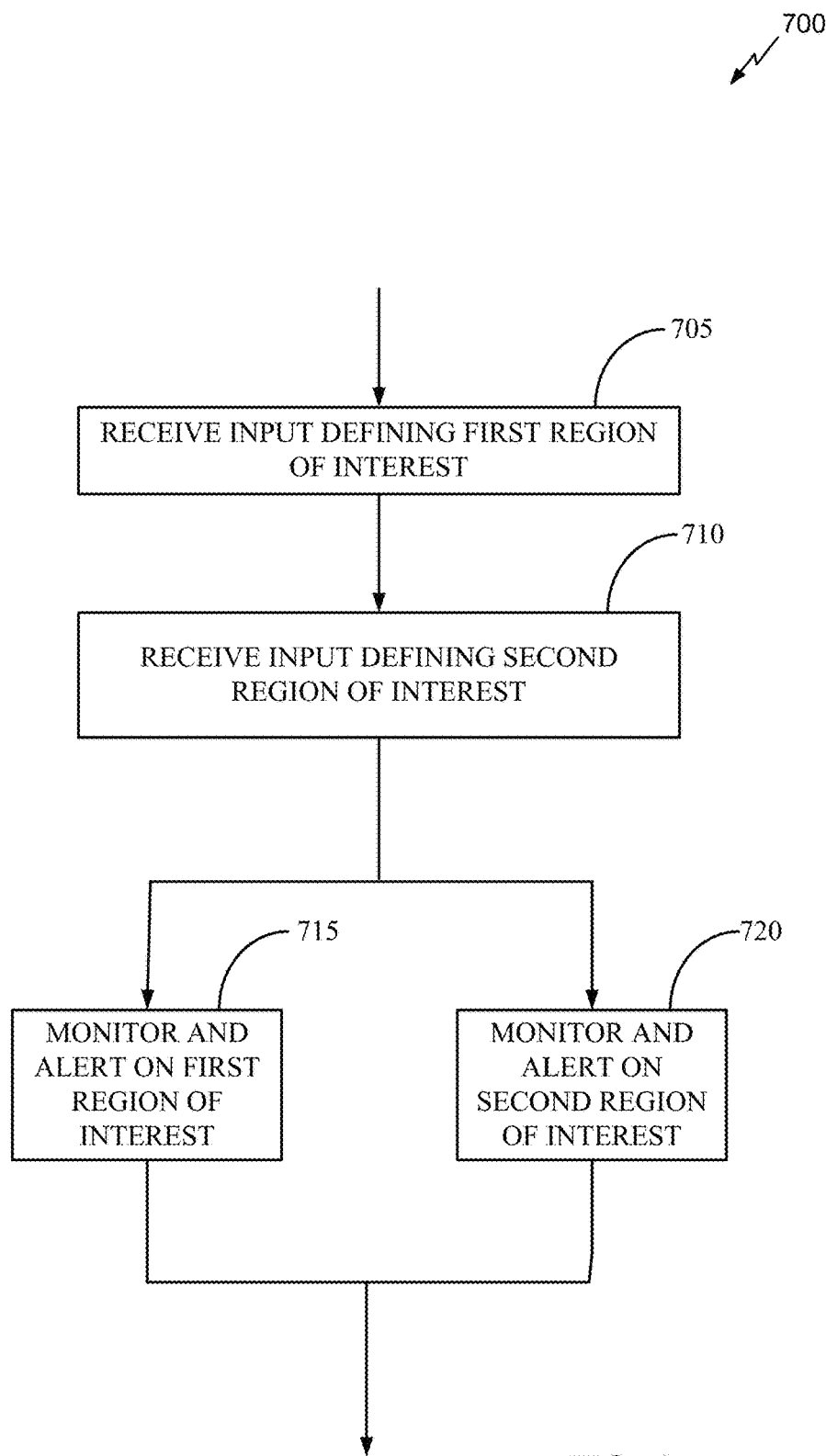
FIG. 6 is a flowchart of a method of monitoring a plurality of regions of interest.

FIG. 6 is a flowchart of a method of monitoring a plurality of regions of interest. In some aspects, the functions discussed below with respect to process 700 may be performed by the processor 310, discussed above with respect to FIG. 3. For example, instructions 330 stored in the memory 315 may configure the processor 310 to perform one or more of the functions discussed below.

In block 705, input is received defining a first region of interest. In some aspects, the input may be received from the user interface 100 described above with respect to FIGS. 1A-C. For example, in some aspects, one or more of controls 112*a-b* may be selected to define the region of interest. In some aspects, a pointing device, such as a touch screen or a mouse may define boundaries of a region of interest within the image 105.

In block 710, second input is received defining a second region of interest. The second input may define the second region of interest in a similar manner as that described above for the first region of interest. For example, as shown in FIG. 1C, in some aspects, multiple regions of interest may be concurrently defined within the user interface 100. For example the first and second regions of interest of blocks 705 and 710 may correspond to regions of interest 110*a-b* respectively o. In some aspects, each of the first and second regions of interest may have different shapes, sizes, and dimensions than those of the example regions of interest 110*a-b* shown in FIGS. 1 and 2B. Additionally, each of the first and second regions of interest may have different parameters associated with warning level indicator 122. For example, a first region of interest may have a first warning level and a second region of interest may have a second warning level.

After the two regions of interest are defined, process 700 performs blocks 715 and 720 at least partially in parallel. Both the first and second regions of interest are monitored and alerts generated based on one or more warning and alert thresholds, as described above with respect to FIGS. 1 and 2. In some aspects, each of blocks 715 and 720 may include one or more of the functions discussed above with respect to processes 500 and 600.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-e, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, the functional means may include a processor and memory operably coupled to the processor, the memory storing instructions that configure to the processor to perform the described functions.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a data communications medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of data communications medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of determining a tank level within a region of interest in an image, comprising:
   receiving a digital image from an imaging sensor positioned to provide a field of view including a side view of a tank configured to contain a substance, the digital image comprising a plurality of pixels each having a pixel value, the pixels arranged in a plurality of lines indicative of image data along a direction parallel to the horizon of the earth;
   determining a region of interest within the digital image;
   determining a tank level of the substance within the region of interest by:
   generating a histogram of pixel values within the region of interest, determining whether a distribution of the pixel values is bimodal based on the histogram, determining whether the tank is either empty or full in response to determining the distribution is not bimodal, in response to determining the distribution is bimodal:

determining a threshold delineating pixels within the region of interest in a first group of the bimodal histogram and pixels within the region of interest in a second group of the bimodal histogram, determining median or average pixel values of the lines indicative of image data along the direction parallel to the horizon of the earth within the region of interest and thresholding the determined median or average pixel values, and based on the thresholded values, determining a tank level measurement value indicative of a portion of the tank filled by the substance, and displaying an indicator of the tank level measurement value.

2. The method of claim 1, wherein determining whether the tank is either empty or full comprises:

determining a similarity measure between a mean or median of pixel values within the region of interest and a configuration value defining an occupied or empty region of the tank; and determining the tank level based on the similarity measure.

3. The method of claim 1, further comprising determining, substantially in parallel, a plurality of tank levels within the digital image and displaying a corresponding plurality of indicators of a plurality of tank level measurement values.

4. The method of claim 1, wherein, determining a threshold delineating pixels within the region of interest in the first group and pixels within the region of interest in the second group comprises determining the threshold based on Otsu's method.

5. The method of claim 1, wherein determining whether the distribution of the pixel values is bimodal based on the histogram comprises;

determining a bimodality coefficient based on a number of pixels in the distribution, a skewness of the distribution, and a kurtosis of the distribution, and determining the distribution is bimodal based on the bimodality coefficient's relationship to a threshold.

6. The method of claim 1, further comprising generating an alert based on the determined tank level measurement value.

7. The method of claim 6, wherein generating an alert comprises providing an indicator for display on an electronic display.

8. The method of claim 6, wherein generating an alert comprises transmitting a network message to a second computing device.

9. The method of claim 6, wherein generating an alert comprises providing a region of interest indicator for display that is a predetermined color associated with the alert.

10. An apparatus for determining a tank level within a region of interest in an image, comprising:

an image capture device positioned to provide a field of view including a side view of a tank configured to contain a substance;

an electronic hardware processor, configured to:

receive a digital image from the image capture device, the digital image comprising a plurality of pixels each having a pixel value, the pixels arranged in a plurality of lines indicative of image data along a direction parallel to the horizon of the earth;

determine a region of interest within the digital image;

determine a tank level of the substance within the region of interest by:

generating a histogram of pixel values within the region of interest, determining whether a distribution of the pixel values is bimodal based on the histogram, determining whether the tank is either empty or full in response to determining the distribution is not bimodal, in response to determining the distribution is bimodal:

determining a threshold delineating pixels within the region of interest in a first group of the bimodal histogram and pixels within the region of interest in a second group of the bimodal histogram, determining median or average pixel values of the lines indicative of image data along the direction parallel to the horizon of the earth within the region of interest and thresholding the determined median or average pixel values, and based on the thresholded values, determining a tank level measurement value indicative of a portion of the tank filled by the substance, and display an output indicating the tank level measurement value.

11. The apparatus of claim 10, wherein determining whether the tank is either empty or full comprises:

determining a similarity measure between a mean or median of pixel values within the region of interest and a configuration value defining an occupied or empty region of the tank; and determining the tank level based on the similarity measure.

12. The apparatus of claim 10, wherein the electronic hardware processor is further configured to determine, substantially in parallel, a plurality of tank levels within the digital image and to display a corresponding plurality of indicators of a plurality of tank level measurement values.

13. The apparatus of claim 10, wherein determining a threshold delineating pixels within the region of interest in the first group and pixels within the region of interest in the second group comprises determining the threshold based on Otsu's method.

14. The apparatus of claim 10, wherein determining whether the distribution of the pixel values is bimodal based on the histogram comprises:

determining a bimodality coefficient based on a number of pixels in the distribution, a skewness of the distribution, and a kurtosis of the distribution, and determining the distribution is bimodal based on the bimodality coefficient's relationship to a threshold.

15. The apparatus of claim 10, wherein the electronic hardware processor is further configured to generate an alert based on the determined tank level.

16. The apparatus of claim 15, wherein the electronic hardware processor is further configured to provide an alert indicator for display on an electronic display.

17. The apparatus of claim 15, wherein the electronic hardware processor is further configured to transmit an alert network message to a second computing device.

18. The apparatus of claim 15, wherein the electronic hardware processor is further configured to provide an alert region of interest indicator for display that is a predetermined color associated with the alert.

* * * * *